United States Patent

[11] 3,608,529

[72] Inventors Richard D. Smith
Palo Alto;
Dale A. Furlong, Sunnyvale, both of Calif.
[21] Appl. No. 820,941
[22] Filed May 1, 1969
[45] Patented Sept. 28, 1971
[73] Assignee Combustion Power Company, Inc.
Palo Alto, Calif.
Continuation-in-part of application Ser. No. 796,089, Feb. 3, 1969.

[54] AIR-POLLUTION-FREE AUTOMOBILE AND METHOD OF OPERATING SAME
28 Claims, 15 Drawing Figs.

[52] U.S. Cl. .................................................. 123/25.2, 123/1, 123/119
[51] Int. Cl. ............................................... F02d 19/00, F02b 75/12, F02b 33/00
[50] Field of Search ............................................ 123/119 E, 25.2, 26; 60/39.05

[56] References Cited
UNITED STATES PATENTS

| | | | |
|---|---|---|---|
| 1,275,481 | 8/1918 | Seymour | 123/119 E |
| 1,711,937 | 9/1927 | Glantz | 123/25.2 |
| 1,776,943 | 9/1929 | Douthit | 123/25.2 |
| 1,905,627 | 9/1930 | Holland | 123/119 E |
| 2,496,623 | 4/1947 | Fragale | 123/119 E |
| 2,879,753 | 3/1957 | McKinley | 123/25.2 |
| 3,101,592 | 1/1961 | Robertson et al. | 60/39.05 |
| 3,459,953 | 3/1967 | Hughes et al. | 60/203 |

FOREIGN PATENTS

| | | | |
|---|---|---|---|
| 551,859 | 3/1943 | Great Britain | 123/119 E |

OTHER REFERENCES

Sae Quarterly Transactions, Jan. 1947 Masi, Flock, and Grosselfinger- " Oxygen Boost of Engine Power at Altitude" pgs. 76-86

Primary Examiner—Benjamin W. Wyche
Assistant Examiner—Ronald B. Cox
Attorney—Charles B. Smith ABSTRACT: An air-pollution-free internal combustion engine and method for operating such engine in which the engine has at least one cylinder, an exhaust port and exhaust valve, fuel, oxygen gas and water spray injectors and a piston in the cylinder, throttle valves for the injectors, a fuel storage and supply system for feeding hydrogen gas or liquid gasoline to the fuel injector, an oxygen storage and supply system for feeding oxygen at first and second pressures to the oxygen gas injector and a water recovery system for recovering water from the exhaust discharged from the cylinder and for feeding the recovered water to the water spray injector.

AIR-POLLUTION-FREE AUTOMOBILE AND METHOD OF OPERATING SAME

This application is a continuation-in-part of U.S. application Ser. No. 796,089 filed Feb. 3, 1969, and relates to air-pollution-free internal combustion engines and the method of the operating thereof and, more particularly, to internal combustion engines for use in automobiles, trucks, tractors, buses and the like.

Air pollution is one of the most pressing problems facing industrial and population centers around the world today. The city dweller is being gradually poisoned with lethal doses of carbon monoxide, unburned hydrocarbons, and nitrogen oxides that pour from millions of exhausts from the internal combustion engines of passenger cars, trucks, buses, and the like, that crowd the streets and highways in ever increasing numbers, Somewhere between 40 percent and 60 percent of the air pollution, or smog, is caused by various forms of such exhaust products.

The three major approaches currently being pursued to provide an air-pollution-free car are: (1) elimination of emissions from air-breathing internal combustion engines by means of catalytic filters, fuel additives, engine design, etc.; (2) development of an external combustion engine (gas turbine, Stirling engine, steam engine) to replace the current internal combustion engine; and (3) development of an electric car to replace current cars.

The first approach is being vigorously pursued by automotive manufacturers and major oil companies because, if successful, it would require minimum change to the automobile as we know it today. Difficult technical problems are involved and long term laboratory research programs are anticipated. One of the most difficult problems in this approach is the elimination of oxides of nitrogens.

The external combustion engine approach requires compromises in performance, convenience, or economy compared to current automobiles. Such external combustion engines are expensive to develop and require drastic changes in the production tooling of the major automobile manufacturers. More importantly, however, such external combustion engines are not completely pollution free.

Of the three approaches, the electric car is the only one completely pollution free. Unfortunately, it is also the approach which requires the most research in order to provide a car that meets today's standards of performance, comfort, and convenience.

The present invention is directed to an air-pollution-free internal combustion engine and automobiles powered thereby and method of operating the same wherein the engine includes at least one cylinder, a piston reciprocating in the cylinder, and an exhaust port and inlet injectors opened and closed cyclically as the piston reciprocates. The inlet injectors include a fuel supply inlet, a nitrogen free oxidant inlet, and a water inlet. Steps and means are provided for supplying controlled amounts of fuel and oxidant to the cylinder for substantially complete combustion therein and for water spraying the cylinder and piston during the exhaust cycle. The engine fuel is either liquid gasoline or gaseous hydrogen and the nitrogen free oxidant for both fuels is substantially pure oxygen.

In accordance with this invention, an engine is provided which is air pollution-free. With hydrogen as the fuel, the only product of combustion is water and with liquid gasoline, the products of combustion are water, carbon dioxide and other nonpollutants.

The engine can be produced with existing manufacturing technology and achieves current standards for performance, convenience, and economy. No unusual starting or warmup problems are introduced and periodic maintenance remains substantially unchanged. Once in production, cars with internal combustion engines of the instant invention will cost approximately the same as family cars with conventional internal combustion engines and trips to the gas station will be of equivalent frequency and cost.

In accordance with another aspect of the present invention, an air-pollution-free, two-stroke internal combustion engine is provided utilizing Otto cycle operation for cruise power and Otto cycle and diesel cycle operation for above cruise power. With this construction and operation, an engine is provided for maximum efficiency in the normal horsepower operating range yet capable of maximum powers and torque at higher ranges.

In accordance with still another aspect of the present invention, water is recovered from the engine exhaust and recycled for water spray cooling the cylinder and pistons during exhaust. A feature and advantage of the invention lies in the fact that water is the major combustion product of the fuel. Cooling fluids for water spray may thus be provided without requiring excessive fluid storage in the car. Such cooling fluids are regenerated during operation.

In accordance with still another aspect of the present invention, where liquid gasoline is utilized as the fuel for the engine, the liquid gasoline is introduced in a stream into the engine cylinder and atomized by the oxygen directed into the cylinder. This operation and construction promote fast and uniform combustion. Other objects and advantages of this invention will become more apparent when reading the following description and referring to the accompanying drawing in which similar characters of reference represent corresponding parts in each of the several views.

As set forth above, the present invention is directed to an air-pollution-free internal combustion engine and method of operating same. It will be appreciated that this engine can be utilized for many purposes and is ideally suited for propelling an automobile and in, combination with other aspects of the present invention, provides an air-pollution-free system of vehicular travel. Therefore, the embodiment of the invention will be described in greater detail below as applied to an internal combustion engine for an automobile and the operational system for such engine and automobile.

Under present day driving habits, the ideal engine for the family sedan should provide maximum efficiency in the horsepower range of about 25 to 50 horsepower yet be capable of a maximum power of 200 horsepower and torque of 250 lb.-feet. A family car with such an engine requires an energy storage of about 134 horsepower hours delivered to the wheels. These requirements are difficult to meet with conventional fourstroke gasoline engines because the maximum power output of such conventional four-stroke gasoline engine is directly proportional to the weight flow of air. Therefore, at any given engine speed, power and torque are increased by increasing the displacement of the engine. Consequently, conventional four-stroke engines used in family cars tend to have rather large displacements in order to meet the maximum power requirements; 300 cubic inches is considered normal today. When these engines are operated at 25 to 50 horsepower, which is the normal range at the more common driving speeds and only a fraction of maximum power, maximum gas temperatures and pressure in the cylinders are reduced greatly because of heat transfer to the large surface area within the combustion chamber. Thermal efficiency and engine efficiency at normal driving speeds is thereby sacrificed. Combustion efficiency of such engine is also sacrificed and air pollution is substantially increased.

In the engine in accordance with the instant invention, high efficiency is accomplished in the more common driving speed range of 25–50 horsepower with a two-stroke engine which is less than one-third the size of an equivalent conventional four-stroke gasoline engine of the type currently used automobiles. Because of the reduction in size, the reduction in the number of strokes, and increase in cylinder pressure during normal, or cruise operation, the thermal efficiency and engine efficiency are substantially improved over conventional four-stroke engines. The instant two-stroke engine can, however, be produced with internal combustion tooling now in use for producing conventional four-stroke gasoline engines.

For purposes of illustration, the instant invention is applied to a two-stroke engine having four-in-line cylinders each connected by a connecting rod to a common crankshaft. The engine includes a conventional coolant jacket, coolant pump, ignition distribution system, exhaust valve and, except as hereinafter noted, conventional accessories and timing mechanisms.

Figures 1, 2A, 2B:
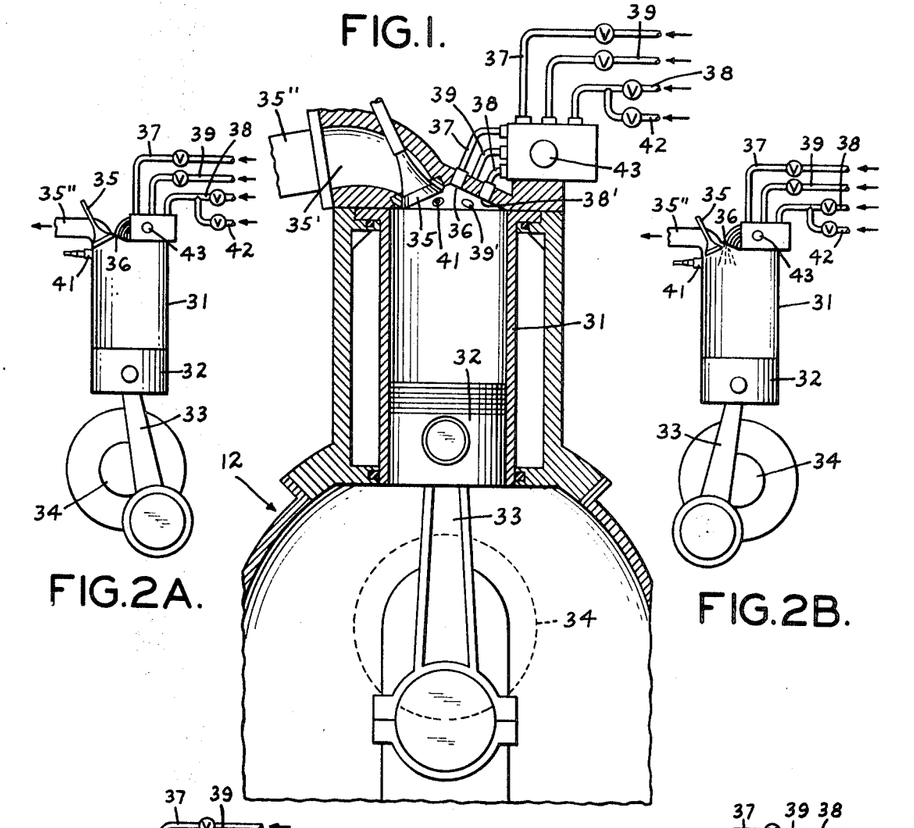
FIG. 1 is an elevational sectional view of a portion of one cylinder of an air-pollution-free engine in accordance with the present invention in which, in one embodiment, the engine is operated with hydrogen-oxygen and, in another embodiment, with gasoline-oxygen.
FIGS. 2A—2E are schematic elevational views of the engine operation in accordance with the present invention illustrating the operating cycle of the engine.

Referring to FIG. 1, showing one cylinder of the two-stroke, four-cylinder, in-line engine illustrating the instant invention, each cylinder has a bore of 2.6 inches and a stroke of 4 inches. The exhaust is removed from cylinder 31 through single overhead valve 35 via exhaust port 35' and exhaust manifold 35" with valve 35 operated by an overhead cam driven in conventional manner, not shown. With an expansion ratio of 20:1, the volume of each combustion chamber is 1.04 cubic inches. The engine, generally designated 12, uses the crankshaft from a conventional internal combustion engine having a 4-inch stroke. The water injector 36, oxygen injector 38', fuel injector 39' and sparkplug 41 are all located in the head. Water injector 36 is centered in the bore to provide a uniform spray to piston 32 and walls of cylinder 31. Water, fuel and oxygen are metered by valves driven by an auxiliary cam on shaft 43 in turn driven in conventional manner, not shown, from crankshaft 34. The fuel metering valve is separated from the oxygen metering valve to provide complete separation of the materials until injection into the combustion chamber. A typical engine constructed in accordance with the present invention is 27 inches long, 25 inches high, 15 inches wide, and weighs approximately 220 pounds.

The fuel and oxygen injected prior to ignition for the cruise portion of the cycle are injected over a crankshaft travel of about 45° for 1.5 milliseconds at 5,000 r.p.m. The dwell angle of injection remains constant, and the amount of fuel and oxygen injected is determined by throttling in the respective feed lines upstream of the metering valves driven by the auxiliary cam on shaft 43.

During the maximum power portion of the cycle, all of the fuel and a portion of the oxygen are injected over the same crankshaft travel and for the same length of time as in the cruise portion. The remaining portion of the oxygen to complete the combustion of the fuel is injected after top dead center over a fixed dwell, for example, about 30° of crankshaft travel for 1 milliseconds at 5,000 r.p.m.

With the pressure of oxygen at 1,600 p.s.i.a. as hereinafter described, 300 p.s.i.a. pressure drop is provided through the oxygen metering valve. The oxygen is throttled upstream of the metering valve to provide throttling for maximum power and concurrent throttling of the fuel injected prior to top dead center is also provided.

In one embodiment of the invention, hydrogen as is used as fuel and oxygen gas is used as the oxidant. In another embodiment, liquid gasoline is used as the fuel and oxygen gas as the oxidant. Because, as will be described in more detail later herein, the hydrogen and oxygen gases are at sufficient pressure, such gases are delivered from the respective storage tanks to the throttling valves and metering valves driven by the auxiliary cam on shaft 43 through appropriate lines connected to the respective storage tanks. When liquid gasoline is used as the fuel, the gasoline is pumped from the storage tank, which is at atmospheric pressure, to the throttling and metering valves, the pump providing sufficient pressure so that the liquid gasoline, in the required amount, can be injected into the cylinder. For this purpose, a pump driven in conventional manner from crankshaft 34 and having suitable throttling and metering means may be employed. Similarly, such a pump is also employed for feeding the water at sufficient pressure for spray cooling each cylinder. Because both the gasoline, when used, and the water are injected at relatively low pressure, and need not be precise, the use of more expensive and precise injector pumps is not required in the practice of the present invention.

The engine in accordance with the present invention and its operation are unique in that water vapor, rather than nitrogen gas, such as is the case when air is used as the oxidant in conventional engines, is the principal fluid utilized as the working fluid. Furthermore, the cylinder walls are cooled with internal water spray. The operation of the engine utilizes the Otto cycle (constant volume combustion) for normal operating power and combines the Otto cycle with the diesel cycle (constant pressure combustion) for higher power. For example, in the automobile engine embodiments described, the otto portion of the engine cycle is used for power levels up to cruise power (40–50 horsepower), and is combined with the diesel cycle for higher power.

Figure 7:
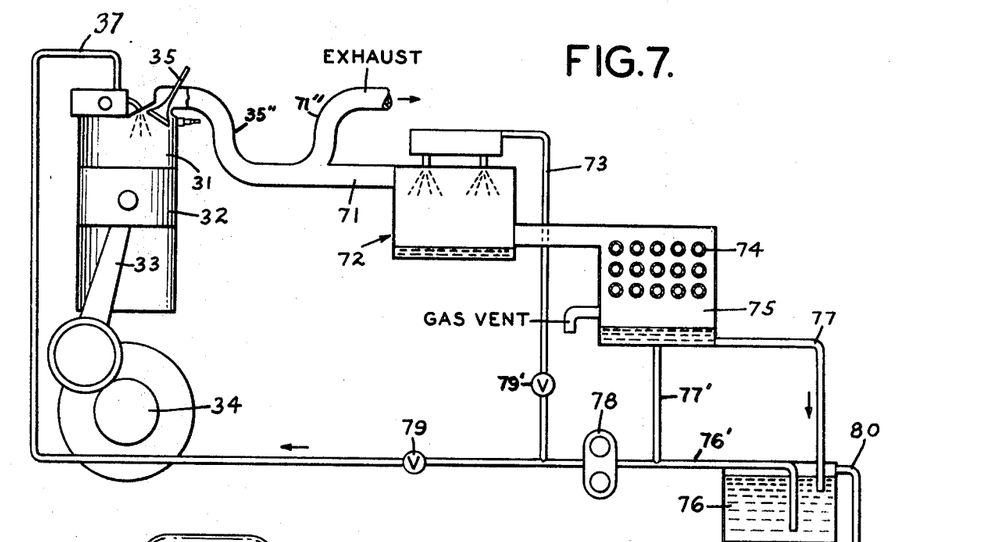
FIG. 7 is a drawing schematically illustrating the water spray and water recovery system of the present invention.

Referring to FIG. 7, water for internal water spray cooling of the cylinder walls and pistons of the engine of the present invention is provided by condensing the water vapor of the working fluid and cooling spray from the exhaust. Exhaust manifold 35" is connected, by line 71, to the top of desuperheater 72, connected near its bottom to condenser 75. Because the amount of water for water spray cooling is less than the amount of water vapor exhausted through exhaust valve 35 and manifold 35", a part of the exhaust may be discharged, through line 71", to the atmosphere. Water or coolant from the radiator and coolant system of engine 12 is circulated through coil 74 in condenser 75. Water condensed from the exhaust in condenser 75 is discharged through line 77 into reservoir 76, having overflow 80 for discharging excess water to the atmosphere and, through line 77', to line 76', connected, at one end, to reservoir 76 and, at its other end, to pump 78. From pump 78 the water is fed, through throttle valve 79, to water spray injector 36, and, through valve 79' and line 73, to the spray head in desuperheater 72. Desuperheater 72, condenser 75, reservoir 76, pump 78 and the various lines, are provided with small vents so that, after engine 12 is shut down, any water remaining in the system will be discharged to the atmosphere. In this way, freezing of the system is avoided where atmospheric temperature is below freezing and the engine is shut down for any extended period of time.

With the exhaust recovery system of the instant invention for recovering water from the engine exhaust, the need for water storage for internal water spray cooling of the cylinders and pistons is avoided. When the engine is first started, the cylinder walls, pistons, engine coolant temperature and elements of the exhaust recovery system are at a relatively low temperature. Thus, when the engine is first started, internal water spray cooling is not required but is required after the cylinder walls and pistons heat up. While this heating up is taking place, the water vapor from the exhaust is being condensed and collected in the recovery system so that, when required for water spray cooling of the cylinder walls and pistons and for spraying in desuperheater 72, water will be available in reservoir 76. If, of course, the engine is shut down and restarted before the cylinder walls, pistons and recovery system has cooled down, the water remaining in the recovery system from the earlier engine operation is available for immediate water spray in the cylinders through spray injector 36.

Referring now to FIGS. 2A—2B, there is illustrated the cruise cycle portion of the engine in accordance with the embodiment of the invention is which hydrogen gas is employed as the fuel and substantially pure oxygen gas as the oxidant. With particular reference to FIG. 2A, there is shown one of the engine cylinders 31 including a working member or piston 32 therein connected via connecting rod 33 to drive shaft 34. The piston 32 is illustrated near the end of the power stroke after combustion of gaseous hydrogen and substantially pure oxygen. The products of combustion and the working fluid (both superheated water vapor) have been expanded, such as 20:1, and the exhaust valve 35 is about to open.

The exhaust valve 35 opens just before bottom dead center and the hot gas in the cylinder blows down to low pressure, the gas in the cylinder expanding adiabatically. Shortly after the blowdown of the superheated vapor in the cylinder, water injection is initiated through injector 36 to cool the cylinder walls, pistons, and exhaust valve (see FIG. 2B). The exhaust valve 35 is left open until the piston has changed the volume ratio, such as where only a 5:1 volume ratio remains, and then the exhaust valve 35 is closed (see FIG. 2C). During this exhaust portion of the stroke, the piston 32 has scavenged the majority of the high temperature vapor from the cylinder. Some of the vapor will be cooled directly by vaporizing the injected water as it is sprayed toward the wall. The water hitting the walls, piston crown, and exhaust valve will flash into low-temperature steam, mixing with the residual high-temperature water vapor and cooling it further. Some of this steam will pass out the exhaust valve along with the residual vapor. At the time the exhaust valve is closed, the volume remaining above the piston in the cylinder is filled with saturated steam.

Figure 2C:
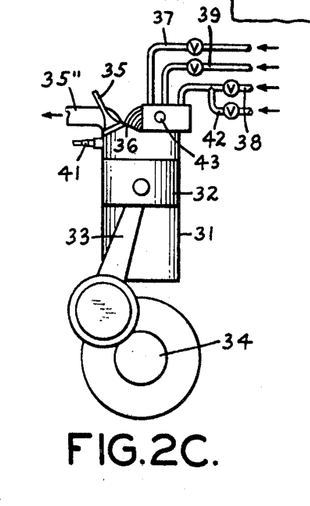

At the time of closing the exhaust valve 35, injection of gaseous hydrogen and oxygen from injectors 38 and 39, respectively, is initiated. This injection occurs between closing of the exhaust valve and several degrees of crankshaft rotation before top dead center.

Figure 2D:
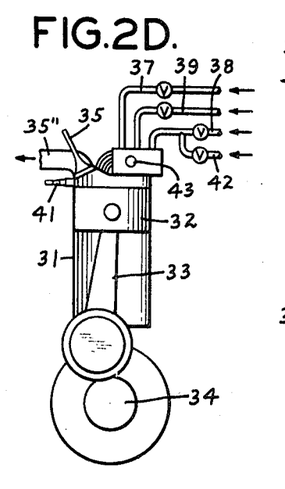

FIG. 2D shows ignition at top dead center where combustion begins and increases the pressure and temperature in the cylinder. Next, the superheated vapor is expanded 20:1 to provide the work output. The superheated vapor transfers heat to the walls which, in addition to cooling by the water jacket, are also cooled by the internal water spray on the exhaust upstroke.

To obtain maximum power, above the single power cycle efficient cruise power range, the engine operation described above is augmented by a second power cycle by post ignition injection. FIGS. 2A–2D and FIG 2E illustrate the various steps of the power cycles. At the end of the power stroke (FIG. 2A), before the exhaust valve opens, the vapor in the cylinder is at a temperature and at a pressure above that at the end of the single cruise cycle power stroke. After the exhaust valve opens, the cylinder blows down, expanding the vapor in the cylinder adiabatically. Water spray is initiated (FIG. 2B) at bottom dead center, as it was for the cruise cycle. The water spray is increased by increasing the flow rate to provide additional water for cooling at this higher power. After the closing of the exhaust valve 35 (FIG. 2C), and during the compression stroke, all of the hydrogen fuel is injected but only that portion of the oxygen is injected which can be injected without causing detonation or failure of the cylinder or piston because of over pressure. The conditions in the cylinder, at the end of compression, are similar to those of the single power cruise cycle, except that pressure is slightly greater due to the pressure of the additional hydrogen and oxygen. Ignition occurs at top dead center by means of a spark ignition from spark plug 41 and the fuel rich mixture burns to produce superheated vapor. Concurrently, FIG. 2E) a valve in a high-pressure oxygen line 42 is opened to supply additional oxygen to burn the remaining unreacted hydrogen at a constant pressure and initiate the second power cycle. Under circumstances where detonation occurs, the hydrogen may be injected on the upstroke as described above, but the oxygen injection may be delayed and initiated shortly before top dead center so as to progressively burn the hydrogen as the oxygen is admitted.

Figures 3, 4, 5, 6:
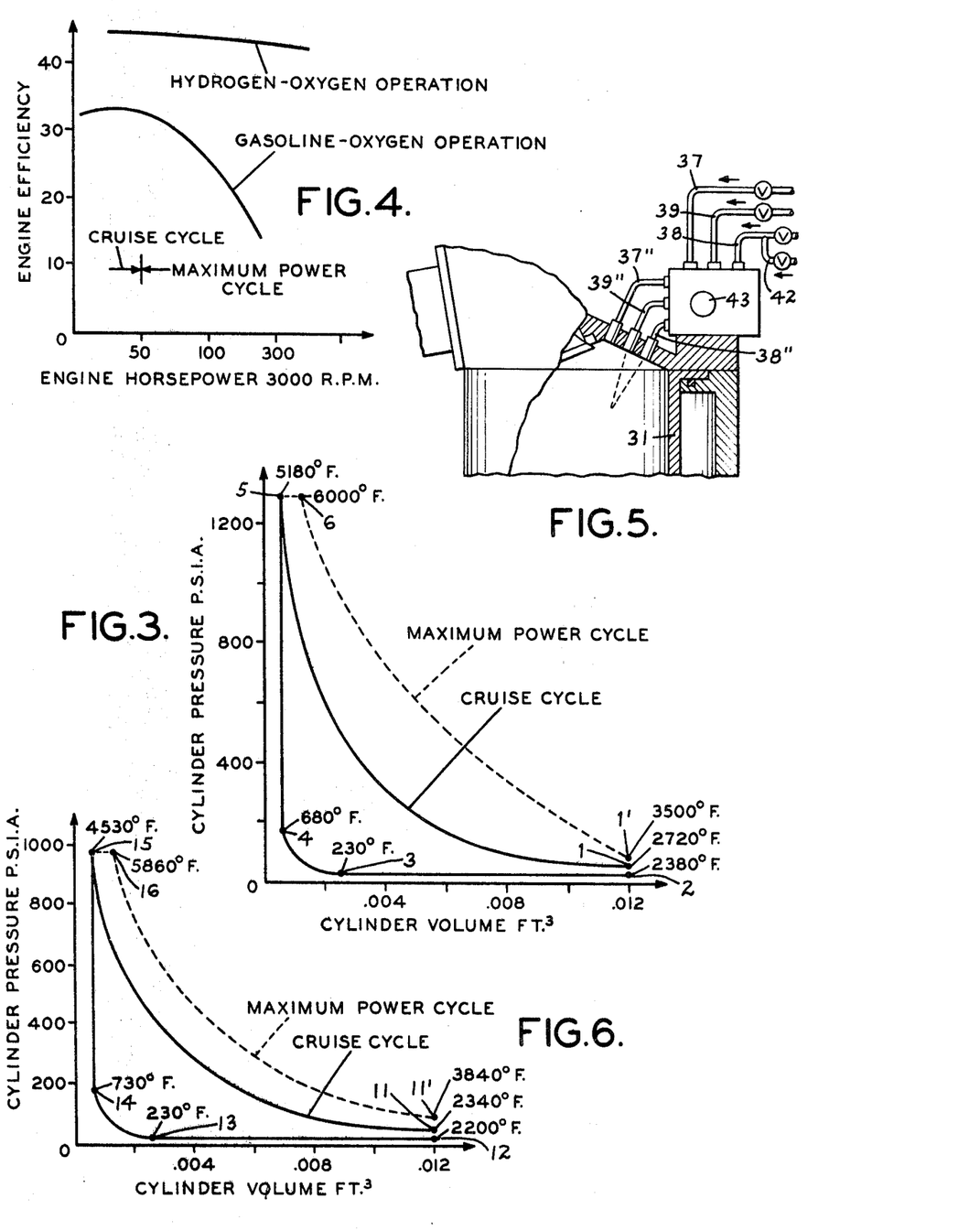
FIG. 3 is a graph of cylinder pressure versus cylinder volume for the engine of FIG. 1 using hydrogen-oxygen for the operation.
FIG. 4 is a graph of engine efficiency versus horsepower in which graph courses for operation with hydrogen-oxygen and gasoline-oxygen are shown.
FIG. 5 is an elevational sectional view of a portion of the engine structure of FIG. 1 showing a portion of the operating cycle with gasoline-oxygen.
FIG. 6 is a graph of cylinder pressure versus cylinder volume, similar to FIG. 3 but using gasoline-oxygen for the operation.

For a clear understanding of the present invention, the parameters of an illustrative embodiment are given and operating characteristics are shown in the pressure versus volume graph of FIG. 3. As shown at the end of the expansion stroke of the cruise single power cycle (FIG. 2A), the cylinder pressure is 39 p.s.i.a. and the superheated vapor temperature is 2,720 F. (Point 1 in FIG. 3). When the exhaust valve opens, the vapor expands adiabatically from 39 p.s.i.a. to 20 p.s.i.a. reducing the vapor temperature to 2,380 F. (Point 2 in FIG. 3). At these temperatures, the speed of sound in water vapor is approximately 3,000 ft./sec. and it takes approximately one-tenth milliseconds for the pressure waves to reach the piston (or 3 of crankshaft rotation at 5,000 r.p.m.) before the flow starts out of the cylinder after the valve has first opened.

For providing the water spray during the exhaust stroke of the cycle, the injector 36 can have a pressure differential of 120 p.s.i.a. from water line 37, causing the water spray to attain a velocity of approximately 100 ft./sec. Consequently, approximately 2 milliseconds is required for a droplet of water of the spray to reach a point on the cylinder wall 3 inches from the top of the combustion chamber. At 5,000 r.p.m. this travel requires about 60 of crankshaft travel and, if the water spray is initiated at bottom dead center, the droplet will reach the wall at the above referred to location shortly before the piston covers it.

At the time when the exhaust valve 35 closes (Point 3 in FIG. 3), substantially only saturated steam at about 230 F. remains above the piston and compression begins.

The maximum pressure in the cylinder rises only to 165 p.s.i.a. Consequently, the back pressure against the injected gas during injection is minimal. Adiabatic compression of the steam at 230 F. (over a 5:1 compression ratio) plus the introduction of hydrogen and oxygen results in a cylinder pressure of 165 p.s.i.a. and a gas temperature of 680 F. (Point 4 in FIG. 3). After ignition, the cylinder pressure increased to about 1,300 p.s.i.a. and the temperature of the vapor therein to about 5,180 F. (Point 5 in FIG. 3). Then, with expansion during the working stroke, the pressure and temperature return to that at point 1 in FIG. 3.

In the maximum dual power cycle operation, the power stroke ends with superheated vapor at a pressure of 71.5 p.s.i.a. and a temperature of about 3,500 F. (Point 1 in FIG. 3). Upon opening of the exhaust valve, the superheated vapor in the cylinder expands adiabatically to a pressure of 20 p.s.i.a. and a temperature of 2,760 F., and, after the water spray and exhaust, saturated vapor remains at 230 F. and 20 p.s.i.a., the same conditions existing for the cruise single power cycle (Point 3 in FIG. 3). During compression and fuel and oxygen injection, only that part of the oxygen is injected to reach a maximum cylinder pressure of 1,300 p.s.i.a. This results in an oxygen-to-fuel ratio of 2.6, well within the combustion limits. The overall oxygen to fuel ratio for hydrogen-oxygen combustion is O/F 8, the stoichiometric ratio. After ignition, the fuel rich hydrogen and oxygen mixture burns to produce superheated vapor at 1,300 p.s.i.a. and additional high-pressure oxygen is injected until all the hydrogen has burned. The superheated vapor reaches about 6,000 F. (Point 6 in FIG. 3). At the start of the expansion stroke, the expansion ratio has been reduced from 20:1 to 8.5:1 by the previous constant pressure expansion (Point 6 on the diagram of FIG. 3) for the maximum power cycle in addition to that of the cruise power cycle. The engine, as described, produces 216 horsepower at 3,000 r.p.m. when operating at conditions as discussed for the maximum dual power cycle.

The engine efficiency of the hydrogen-oxygen engine is illustrated in FIG. 4 as a function of engine horsepower at a constant speed of 3,000 r.p.m. The curve peaks at an efficiency of 45 percent at 60 horsepower (slightly more than required for normal driving) but drops off very little at the higher horsepower levels of the maximum dual power cycle. One would normally expect a sharper drop off at the higher powers because the expansion ratio is greatly reduced due to the constant pressure portion of the cycle (post ignition injection). However, this trend toward lower efficiencies is offset by the increasing temperature of the superheated vapor in the cylinder, tending toward increasing the efficiency.

In accordance with another embodiment of the invention, gasoline and oxygen, rather than hydrogen and oxygen, are burned to provide a two-cycle internal combustion engine in which the maximum efficiency is in the 25–50 horsepower range yet such engine is capable of maximum power of 200 horsepower and 250 lbs.-ft. of torque. For purposes of comparison, the engine in accordance with this embodiment is designed with the same displacement, bore and stroke as the air-pollution-free engine utilizing hydrogen and oxygen described above. The engine burning gasoline and oxygen operates basically on the same cycle as the hydrogen and oxygen-burning engine but derives its pollution-free potential from completely oxidizing the hydrocarbons in gasoline in the absence of nitrogen. Consequently, oxygen rich mixtures can be used to thoroughly oxidize the fuel without the usual production of nitrogen oxides as is the case in conventional engines where air is employed.

The operation of the engine in accordance with this embodiment conforms generally to the operation described above with reference to FIGS. 2A–2E but wherein liquid gasoline instead of gaseous hydrogen is directed into the cylinder through line 39. The gasoline is burned in a gas mixture with a high oxygen concentration and, typically, with 15 percent excess oxygen. As a result, at the end of the combustion stroke, as shown in FIG. 2A, the hydrocarbons of the gasoline are completely oxidized to water and carbon dioxide. The same Otto cycle and diesel cycle, as described above, are utilized for the cruise, single power cycle and maximum dual power cycle operations of the engine.

As illustrated in FIG. 5, the gas fuel inlet port 39'' is arranged with respect to the gaseous oxygen inlet port 38'' such that within the cylinder 31' the jet of oxygen from inlet port 38'' hits the stream of liquid gasoline entering through port 39'' whereby the gasoline is finely atomized and dispersed throughout the combustion chamber within the cylinder. The gasoline and oxygen are not mixed prior to introduction into the cylinder for reasons of safety.

The graph showing cylinder pressure versus cylinder volume for the engine burning liquid gasoline and gaseous oxygen is illustrated in FIG. 6 wherein points 11–16 correspond, respectively, with points 1–6 described above with reference to FIG. 3 in setting forth the operation of the engine burning hydrogen and oxygen.

As with the engine burning hydrogen and oxygen, all of the gasoline is introduced prior to ignition and an amount of oxygen is introduced consistent with obtaining the maximum chamber pressure. By introducing all of the gasoline prior to ignition, the subsequent burning of the highly gasoline rich mixture thoroughly vaporizes the excess gasoline and heats it to combustion temperatures. Consequently, when oxygen is finally introduced, the fuel will burn quickly and thoroughly.

In this gasoline-oxygen embodiment of the invention, the hydrocarbon fuels are burned substantially completely to eliminate air polluting carbon monoxide, unburned hydrocarbon and nitrogen oxides normally resulting from the use of gasoline and air in internal combustion engines. The production of nitrogen oxide is not possible in the instant invention because the element nitrogen is not present in the cylinder. Furthermore, when the gasoline is burned in the highly concentrated oxygen environment of this invention, intimate contact between the gasoline molecules and the oxygen molecules is accomplished. Compared to the combustion of the same fuel in air, the burning rate is increased; the temperature of the products of combustion is higher; and thoroughness of combustion of the fuel is assured.

Because, in internal combustion engines using air and gasoline, air contains about 78 percent nitrogen and 21 percent oxygen by volume, and 75.8 percent nitrogen and 23.2 percent oxygen by weight, the diluting effect of nitrogen can well be appreciated. Nitrogen does not contribute to the oxidation process but acts to dilute the effective oxygen concentration, making it more difficult for an oxygen molecule to find a fuel molecule with which to react. In addition to its role as a diluent, the nitrogen also acts as a heat sink to absorb the energy released in the chemical reaction. The nitrogen is heated along with the products of the reaction and, because it is present in such large quantities, it reduces the maximum temperature of the fuel-air reaction, reducing thermal efficiency for maximum power.

The engine efficiency, of the gasoline-oxygen engine, is illustrated, in FIG. 4, as a function of engine horsepower at a constant speed of 3,000 r.p.m. The difference between the efficiencies of the hydrogen-oxygen and gasoline-oxygen embodiments is explained by the low molecular weight of water vapor (18) compared to carbon dioxide (44). The gasoline burned in the gasoline-oxygen engine produces carbon dioxide which supplies only 40 percent of the work of water vapor during the expansion process because of the difference in molecular weight. The effect of the carbon dioxide becomes increasingly pronounced as power is increased because the relative percentage of carbon dioxide is similarly increased. At cruise power, the water vapor diluent is more effective in reducing the average molecular weight of the working fluid.

In the illustrative embodiments, sufficient water is sprayed into each cylinder of each exhaust stroke to cool the cylinder and piston. During operation of the engine at maximum power more water spray is required than for cooling at normal cruise power. For example, in the hydrogen-oxygen embodiment, approximately 0.00015 pounds of water are required for water spray on each exhaust stroke at normal cruise power and approximately 0.0004 pounds per stroke at maximum power. Such water is injected into cylinder 31, through spray head 36, FIG. 1, as a medium fine spray. If too fine, the spray will be evaporated and will not reach the cylinder wall and piston crown for cooling. If too coarse, the spray will not distribute uniformly on the cylinder walls. Preferably, only nominal pressures, such as 120 p.s.i.a., are employed at the water spray nozzle. The amount of water to be sprayed is controlled by valve 79, FIG. 7.

The engine of the instant invention, whether the embodiment in which the fuel is hydrogen or gasoline, may be installed in the front or rear of the automobile, depending upon the automobile design, and is coupled to the drive gear in conventional manner as, for example, by a conventional transmission, torque converter, or the like. The storage tanks, whether hydrogen and oxygen gases, or gasoline and oxygen gas, are located in the vehicle at a convenient location, where they are out of the way, and can be conveniently filled. Preferably, however, the tanks are located as separate locations in the vehicle in the interest of safety.

Figure 8:
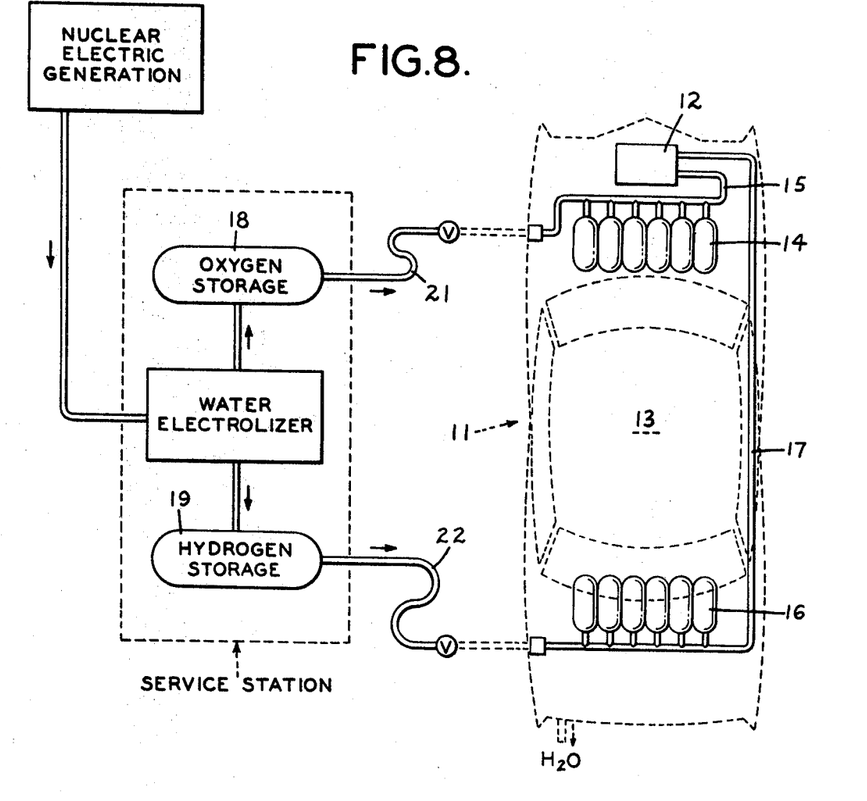
FIG. 8 is a schematic view, partially in block diagram form and partially in plan, schematically illustrating the adaption of the hydrogen-oxygen embodiment to an automobile.
Figure 9:
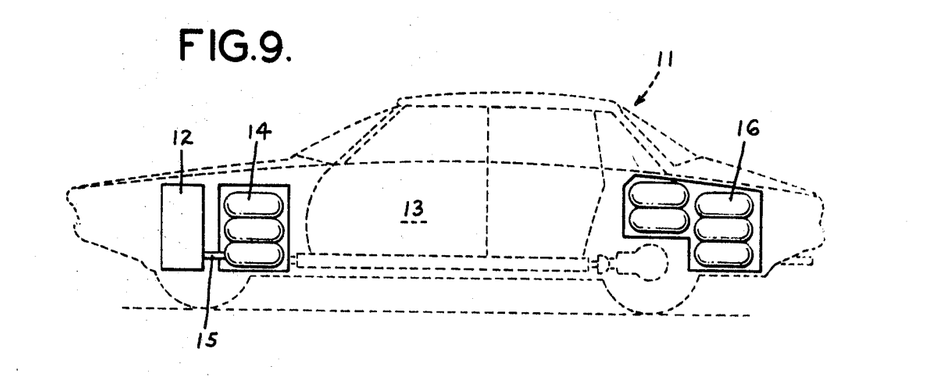
FIG. 9 is a schematic elevational view of the automobile illustrated in FIG. 8.

Referring now to FIGS. 8 and 9, two-stroke internal combustion engine 12 of the instant invention is located in the front of passenger compartment 13 of the vehicle, generally designated 11. In this embodiment combustion fuel for engine 12 is provided from hydrogen tanks 16 located at the rear of compartment 13 and connected to engine 12 by line 17 and oxidant from oxygen tanks 14 located at the front of passenger compartment 13 and connected to engine 12 by line 15. Oxygen tanks 14 are refilled or recharged from an oxygen storage tank, such as tank 18 at a service station, through line 21 having a quick connect coupling for connection to a suitable fitting on the vehicle and hydrogen tanks 16 are refilled or recharged in a similar manner from hydrogen storage tanks 19 through line 22.

Figure 10:
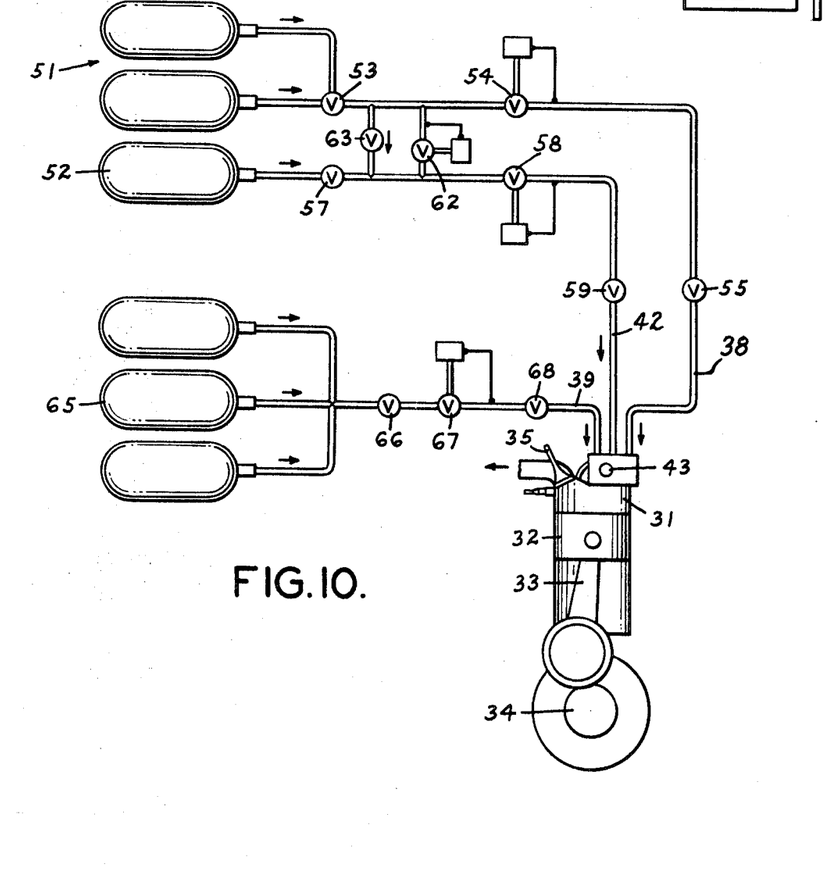
FIG. 10 is a schematic illustration of the gas supply system for an engine in accordance with the present invention.

Referring to FIG. 10 there is shown a schematic diagram of the storage and injection system for the oxygen gas for the engine of the instant invention. The oxygen gas is stored initially in the storage tanks at a pressure in excess of the injection pressure. For example, the gas is stored in the storage tanks at 5,000 p.s.i.a. The gas injection system of the illustrative embodiments utilizes the lowest possible gas injection pressure, 600 p.s.i.a. to take maximum advantage of the capacity of the storage tanks. If the pressure drops below the gas injection pressure, the engine begins to lose power, thereby warning the driver to stop at a service station and recharge the tanks. A special high-pressure oxygen system is used for post ignition for the maximum power cycle.

As illustrated, the oxygen storage tanks are segregated into two groups, cruise oxygen tanks 51 and maximum power oxygen tanks 52. Typically, the cruise oxygen tanks are on the order of 90 percent of the total tanks. Cruise oxygen from tanks 51 goes through a shutoff valve 53, actuated by the ignition key, and a pressure reducing regulator 54 to reduce the oxygen pressure to approximately 500 p.s.i.a. At the engine 12, oxygen passes through a throttling valve 55 controlled by the automobile accelerator (not shown) and metering valve driven by shaft 43 to inject the oxygen into the cylinder at the proper time of the cycle.

The oxygen from tanks 52 to provide maximum power goes through a shutoff valve 57 and a pressure reducing regulator 58 to a pressure above the constant pressure level of the cruise power cycle, for example, to a pressure of 1,600 p.s.i.a., and then through throttle valve 59. To insure complete utilization of all oxygen, a valving assembly is provided for connecting the conduits of the cruise power cycle oxygen tanks 51 and maximum power oxygen tanks 52, respectively, when either the pressure in the cruise oxygen tanks falls to 500 p.s.i.a. or the pressure in the power oxygen tanks falls to 1,600 p.s.i.a. This valving assembly can include a regulator 62 which allows oxygen from maximum power oxygen tanks 52 to bleed into the cruise power cycle line to maintain a pressure of 600 p.s.i.a. in the cruise power cycle line and a check valve 63 which allows oxygen from cruise power cycle tanks 51 to bleed into the maximum power oxygen line if pressure in maximum power cycle oxygen tanks 52 drops below the pressure of the cruise tanks.

The hydrogen storage and injection system, for the embodiment of the invention utilizing hydrogen gas as the fuel, is similar to the cruise power cycle oxygen system and include pressure tank 65, shutoff valve 66, pressure reducing valve 67, throttle valve 68 and injection valve 69. Throttle valve 68 introduces additional hydrogen into the cylinder during the maximum power cycle.

Figure 11:
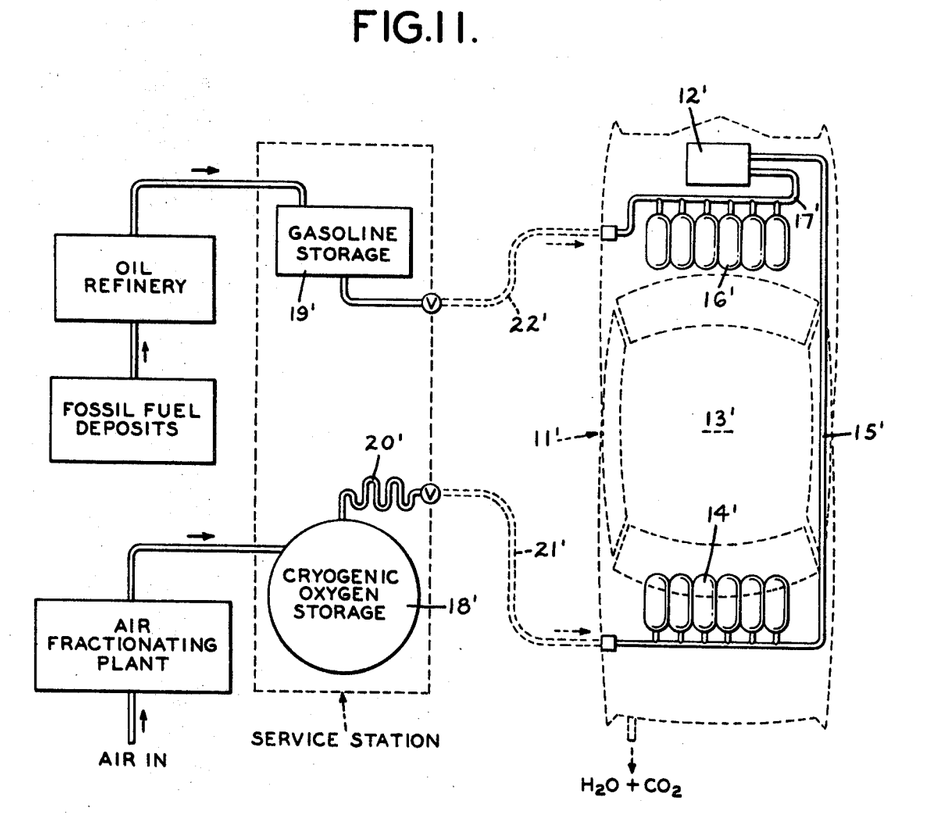
FIG. 11 is a schematic view, partially in block diagram form and partially in plan schematically illustrating the adaption of the gasoline-oxygen embodiment to an automobile.

In FIG. 11, the embodiment of the invention in which gasoline is used as the fuel and oxygen as the oxidant of the two-stroke internal combustion engine of the instant invention is shown adapted to a passenger vehicle. Engine 12' is located in front of passenger compartment 13' and combustion fuel is delivered to engine 12' from gasoline tank 16' through line 17'. Gasoline tanks 16' and engine 12' are located at the front of passenger compartment 13'. Oxygen tanks 14' are located at the rear of compartment 13' and are connected by line 15' through engine 12'. Gasoline tanks 16' are refilled from gasoline storage tank 19', located at the service station, through line 22' in the manner conventionally employed for the fueling of passenger vehicles with conventional four-stroke gasoline engines. Oxygen gas for refilling oxygen tanks 14' on the vehicle is fed from liquid oxygen storage tanks 18', located in the service station, through converter 20' and line 21'. A suitable quick connect coupling is provided on the vehicle and on the end of line 21' for feeding the oxygen from converter 20' to oxygen tanks 14' and for closing off the connection, at the vehicle, when the end of line 21' is removed from the vehicle connection.

The terms and expressions which have been employed are used as terms of description and not of limitation, and there is no intention in the use of such terms and expressions of excluding any equivalents of the features shown and described or portions thereof, but is is recognized that various modifications are possible.

What is claimed is:

1. An air-pollution-free internal combustion engine comprising:
1. at least one cylinder;
2. a piston reciprocating in said cylinder;
3. an exhaust port in said cylinder;
4. an exhaust valve in said port;
5. a fuel injector in said cylinder;
6. an oxygen injector in said cylinder for injecting substantially pure oxygen gas as the sole combustion oxidant;
7. a water spray injector in said cylinder;
8. means for supplying a metered amount of fuel to said fuel injector;
9. means for supplying substantially pure oxygen to said oxygen inlet injector in a metered amount at least sufficient for complete combustion of said metered amount of fuel;
10. means for supplying water to said water spray injector in a metered amount sufficient to cool the piston cylinder wall, and exhaust gas by vaporization of the water;
11. means for cyclically opening and closing the exhaust valve in said exhaust port;
12. means for injecting said metered amounts of oxygen into said cylinder;
13. means for injecting said metered amounts of fuel into said cylinder;
14. means for igniting the injected mixture of fuel and oxygen to produce combustion; and
15. means of injecting said metered amounts of water into said cylinder during the exhaust stroke to cool the piston, cylinder wall and exhaust gas, without causing substantial cooling of the hot gas during combustion and expansion.

2. An air-pollution-free internal combustion engine comprising:
1. at least one cylinder;
2. a piston reciprocating in said cylinder;
3. an exhaust port in said cylinder;
4. an exhaust valve in said port;
5. a fuel injector in said cylinder;
6. an oxygen injector in said cylinder for injecting substantially pure oxygen gas as the sole combustion oxidant;
7. a water spray injector in said cylinder;
8. fuel storage means;
9. oxygen storage means;
10. means for feeding fuel from said fuel storage means to said fuel injector in a metered amount;
11. means for feeding oxygen from said oxygen storage means to said oxygen injector in a metered amount at least sufficient for complete combustion of said metered amount of fuel;
12. means connected to said exhaust port for recovering water from the exhaust gas of the combustion of said fuel and oxygen in said cylinder, said exhaust gas discharged from said cylinder through said exhaust port to said means for recovering water;
13. means for supplying the water recovered from said exhaust gas by said means for recovering water to said water spray injector in a metered amount sufficient to cool the piston, cylinder wall and exhaust gas by vaporization of the water;
14. means for injecting said metered amounts of fuel into said cylinder;
15. means for injecting said metered amounts of oxygen into said cylinder;
16. means for injecting said metered amounts of water into said cylinder during the exhaust stroke to cool the piston, cylinder wall and exhaust gas without causing substantial cooling of the hot gas during combustion and expansion of the gas;

17. means for igniting the injected mixture of fuel and oxygen to produce combustion; and
18. means for cyclically opening and closing the exhaust valve in said exhaust port.

3. An engine, as recited in claim 2, in which said means for recovering water from said exhaust gas comprises a condenser, said condenser including coils and means for circulating coolant from said engine through said coils.

4. An engine, as recited in claim 3, in which said means for recovering water from said exhaust gas comprises a desuperheater, means for spraying water in said desuperheater and means for delivering water discharged from said condenser to said water spray means in said desuperheater.

5. An engine, as recited in claim 4, in which said means for recovering water from said exhaust gas comprises a reservoir, means for discharging exhaust and condensate, including water sprayed into said desuperheater, from said desuperheater into said condenser, means for discharging exhaust and condensate, including sprayed water, from said condenser into said reservoir and means for feeding water from said reservoir to said water spray means in said desuperheater and to said water spray injector in said cylinder.

6. An engine, as recited in claim 2, in which said oxygen storage means includes a first set of interconnected oxygen storage tanks, a second set of interconnected oxygen storage tanks, means for feeding oxygen from said first set of storage tanks to said oxygen injector, means for metering said oxygen fed from said first set of storage tanks to said oxygen injector, means for feeding oxygen from said second set of storage tanks to said oxygen injector and means for metering said oxygen fed from said second set of storage tanks to said oxygen injector.

7. An engine, as recited in claim 1, in which said oxygen storage means comprises a first set of interconnected oxygen storage tanks, a second set of interconnected oxygen storage tanks, means for feeding oxygen from said first set of storage tanks to said oxygen injector, means for metering said oxygen fed from said first set of storage tanks to said oxygen injector, means for feeding oxygen from said second set of storage tanks to said oxygen injector and means for metering said oxygen fed from said second set of storage tanks to said oxygen injector.

8. An engine, as recited in claim 7, in which said oxygen storage means comprises means for feeding oxygen from said first set of storage tanks to said means for feeding oxygen from said second set of storage tanks and means for feeding oxygen from said second set of storage tanks to said means for feeding oxygen from said first set of storage tanks.

9. An engine, as recited in claim 2, in which said fuel is a liquid hydrocarbon.

10. An engine, as recited in claim 8, in which said fuel is gasoline.

11. An engine, as recited in claim 2, in which said fuel is hydrogen gas.

12. An engine, as recited in claim 8, in which said fuel is hydrogen gas.

13. An engine, as recited in claim 11, in which said hydrogen gas fuel storage means comprises a set of interconnected storage tanks, means for supplying hydrogen gas from said storage tanks to said fuel injector, said means for supplying said hydrogen gas including means for regulating the flow of said hydrogen gas through said supplying means.

14. An engine, as recited in claim 12, in which said hydrogen gas fuel storage means comprises a set of interconnected storage tanks, means for supplying hydrogen gas from said storage tanks to said fuel injector, said means for supplying said hydrogen gas including means for regulating the flow of said hydrogen gas through said supplying means.

15. A method for operating an internal combustion engine having:
1. at least one cylinder;
2. a piston reciprocating in said cylinder;
3. an exhaust port in said cylinder;
4. an exhaust valve in said port;
5. a fuel injector, oxygen injector, and water spray injector in said cylinder;
6. means for supplying metered amounts of fuel, oxygen and water to their respective said injectors;
7. means for injecting said fuel oxygen and water into said cylinder;
8. means for cyclically opening and closing the exhaust valve in said exhaust port, and
9. means for igniting the injected mixture of fuel and oxygen to produce combustion, which comprises:
   a. closing said exhaust port with said exhaust valve as said piston reciprocates towards said exhaust port and said fuel, oxygen, and water spray injectors;
   b. injecting into said cylinder a metered amount of fuel and substantially pure oxygen gas as the sole combustion oxidant while said exhaust port is closed;
   c. combusting said fuel and oxygen gas in said cylinder;
   d. opening said exhaust valve after said fuel and oxygen gas are combusted and discharging the exhaust products of combustion from said cylinder, and
   e. spraying the cylinder, piston, and exhaust products of combustion with a metered amount of water during the exhaust stroke, and without causing substantial cooling of the hot gas during combustion and expansion.

16. A method as recited in claim 15 in which the water from the exhaust discharge from said cylinder through the open exhaust valve is recovered from said exhaust and fed into said cylinder through said water spray injector to cool said cylinder and piston.

17. A method as recited in claim 16 in which a portion of the water recovered from said exhaust is sprayed into said exhaust for cooling said exhaust.

18. A method as recited in claim 15 in which a first metered amount of oxygen gas is injected into said cylinder with said fuel and combusted and, while said first metered amount of oxygen gas and said fuel is being combusted, a second metered amount of oxygen gas is injected into said cylinder and combusted with fuel in said cylinder.

19. A method as recited in claim 17 in which said fuel is hydrogen gas.

20. A method as recited in claim 17 in which said fuel is liquid gasoline.

21. A method as recited in claim 19 in which a first metered amount of oxygen gas is injected into said cylinder with said fuel and combusted and, while said first metered amount of oxygen gas and said fuel is being combusted, a second metered amount of oxygen gas is injected into said cylinder and combusted with fuel in said cylinder.

22. A method as recited in claim 20 in which a first metered amount of oxygen gas is injected into said cylinder with said fuel and combusted and, while said first metered amount of oxygen gas and said fuel is being combusted, a second metered amount of oxygen gas is injected into said cylinder and combusted with fuel in said cylinder.

23. An engine as recited in claim 1 wherein said fuel is a liquid hydrocarbon.

24. An engine as recited in claim 1, wherein said fuel is gasoline.

25. An engine as recited in claim 1, wherein said fuel is hydrogen.

26. An engine as recited in claim 1, wherein said means for igniting the injected mixture is a spark plug and further including:
   i. means for closing the exhaust valve prior to the completion of the exhaust stroke to entrain a limited amount of cooled exhaust gas in the cylinder as working fluid;
   ii. means for injecting metered amounts of fuel into the cylinder after closing of the exhaust valve and prior to top dead center while low pressures exist in the cylinder; and
   iii. means for injecting metered amounts of high pressure oxygen into the cylinder after combustion has been initiated.

27. An engine, as recited in claim 2 wherein said means for igniting the injected mixture is a spark plug, and further including:

i. means for closing the exhaust valve prior to the completion of the exhaust stroke to entrain a limited amount of cooled exhaust gas in the cylinder as working fluid;

ii. means for injecting metered amounts of fuel into the cylinder after closing of the exhaust valve and prior to top dead center while low pressures exist in the cylinder; and iii. means for injecting metered amounts of high pressure oxygen into the cylinder after combustion has been initiated.

28. A method of operation as recited in claim 15 in which said fuel is a liquid hydrocarbon.

UNITED STATES PATENT OFFICE
CERTIFICATE OF CORRECTION

Patent No. 3,608,529           Dated Sept. 28, 1971

Inventor(s) Richard D. Smith and Dale A. Furlong

Figure 2E:
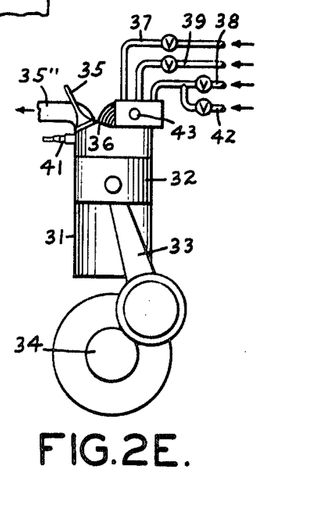

It is certified that error appears in the above-identified patent and that said Letters Patent are hereby corrected as shown below:

Col. 3, line 2, "foursstroke" should read -- four-stroke --;

Col. 3, line 24, after "used" insert -- in --;

Col. 4, line 7, after "hydrogen" delete "as" and insert --gas--;

Col. 4, line 39, "otto" should read -- Otto --;

Col. 6, line 6, "FIG. 2E)" should read -- (FIG. 2E) --;

6, line 21, "2,720" should read -- 2720° --;

6, line 23, "2,380" should read -- 2380° --;

6, line 27, "3" should read -- 3° --;

6, line 36, "60" should read -- 60° --;

6, line 41, "230" should read -- 230° --;

6, line 48, "680" should read -- 680° --;

6, line 56, "3,500" should read -- 3500° --;

6, line 60, "2,760" should read -- 2760° --;

6, line 61, "230" should read -- 230° --;

6, line 68, before "8" insert -- = --;

6, line 72, "6,000" should read -- 6000° --.

Signed and sealed this 16th day of May 1972.

(SEAL)
Attest:

EDWARD M. FLETCHER, JR.
Attesting Officer

ROBERT GOTTSCHALK
Commissioner of Patents